(12) United States Patent
Zhou et al.

(10) Patent No.: US 9,021,094 B1
(45) Date of Patent: Apr. 28, 2015

(54) ALLOCATION OF RESOURCES FOR TIERS OF A MULTI-TIERED SYSTEM BASED ON SELECTING ITEMS FROM RESPECTIVE SETS

(75) Inventors: Yunhong Zhou, Sunnyvale, CA (US); Anshul Kothari, Mountain View, CA (US); Ram Swaminathan, Cupertino, CA (US); Robert E. Tarjan, Princeton, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3224 days.

(21) Appl. No.: 11/116,728

(22) Filed: Apr. 28, 2005

(51) Int. Cl.
*G06F 15/16* (2006.01)
*G06F 17/30* (2006.01)
*G06F 9/455* (2006.01)

(52) U.S. Cl.
CPC ...... *G06F 17/30528* (2013.01); *G06F 9/45533* (2013.01)

(58) Field of Classification Search
USPC .......... 709/223, 224, 225, 226, 203; 705/5, 6, 705/7
See application file for complete search history.

(56) References Cited

U.S. PATENT DOCUMENTS

| | | | |
|---|---|---|---|
| 6,272,543 B1 | 8/2001 | Nozawa | |
| 6,859,929 B1 | 2/2005 | Smorodinsky | |
| 6,912,232 B1* | 6/2005 | Duffield et al. | 370/468 |
| 7,085,837 B2 | 8/2006 | Kimbrel | |
| 7,099,936 B2 | 8/2006 | Chase | |
| 7,146,353 B2 | 12/2006 | Garg | |
| 7,174,379 B2 | 2/2007 | Agarwal | |
| 7,213,065 B2 | 5/2007 | Watt | |
| 7,243,167 B2 | 7/2007 | Zimmer | |
| 7,257,635 B2 | 8/2007 | Chellis | |
| 7,594,016 B1 | 9/2009 | Zhou | |
| 2002/0116457 A1* | 8/2002 | Eshleman et al. | 709/203 |
| 2002/0156667 A1* | 10/2002 | Bergstrom | 705/7 |
| 2002/0198995 A1* | 12/2002 | Liu et al. | 709/226 |
| 2003/0120780 A1* | 6/2003 | Zhu et al. | 709/226 |
| 2003/0154282 A1* | 8/2003 | Horvitz | 709/226 |
| 2003/0154356 A1 | 8/2003 | Kamel | |
| 2004/0010544 A1* | 1/2004 | Slater et al. | 709/203 |
| 2004/0066785 A1* | 4/2004 | He et al. | 370/395.21 |
| 2004/0230680 A1* | 11/2004 | Jain et al. | 709/226 |
| 2005/0102398 A1* | 5/2005 | Zhang et al. | 709/225 |
| 2006/0069594 A1 | 3/2006 | Yamasaki | |
| 2006/0101467 A1* | 5/2006 | Buco et al. | 718/102 |
| 2006/0136581 A1* | 6/2006 | Smith | 709/224 |
| 2007/0022426 A1 | 1/2007 | Steinder | |

OTHER PUBLICATIONS

"Server Application Problem for Multi-Tiered Applications"—HP, Sep. 2004 http://www.hpl.hp.com/techreports/2004/HPL-2004-151.html.*

(Continued)

*Primary Examiner* — Randy Scott
(74) *Attorney, Agent, or Firm* — Trop, Pruner & Hu, P.C.

(57) ABSTRACT

Plural sets of items corresponding to plural tiers of a multi-tiered system are defined, where the items represent amounts of resources to allocate to the tiers. Items from respective sets are selected based on a response time constraint and a target cost. Information is provided pertaining to allocation of amounts of resources to the respective tiers based on the selected items.

16 Claims, 2 Drawing Sheets

(56) References Cited

OTHER PUBLICATIONS

A. Zhang et al., U.S. Appl. No. 10/706,401, entitled "System and Method for Allocating Server Resources," filed Nov. 12, 2003, pp. 1-45, Figs. 1-7.
http://www.slimy.com/~steuard/tutorials/Lagrange.html, "An Introduction to Lagrange Multipliers," pp. 1-8 (2004).
K. Chaudhuri et al., "Server Allocation Problem for Multi-Tiered Applications," pp. 1-12 (Sep. 17, 2004).
A. Zhang et al., "Optimal Server Resource Allocation Using an Open Queueing Network Model of Response Time," pp. 1-17 (Nov. 1, 2002).
P. Garg et al., "Web Transaction Analysis and Optimization (TAO)," presented at WOSP '02 Rome, Italy, Jul. 24-26, 2002, pp. 286-293.
X. Zhu et al., "Resource Assignment for Large-Scale Computing Utilities Using Mathematical Programming," pp. 1-17 (Feb. 23, 2004).
U.S. Appl. No. 11/117,197, Office Action dated Jul. 11, 2008, pp. 1-17 and attachments.
U.S. Appl. No. 11/117,197, Office Action dated Jan. 7, 2009, pp. 1-20 and attachments.
U.S. Appl. No. 11/153,925, Office Action dated Dec. 1, 2008, pp. 1-5 and attachments.
U.S. Appl. No. 11/298,248, Office Action dated Dec. 2, 2008, pp. 1-15 and attachments.
Zhou et al., U.S. Appl. No. 11/153,925, entitled "Calculating Numbers of Servers for Tiers of a Multi-Tiered System," filed Jun. 16, 2005, pp. 1-31, Figs. 1-2.
Zhou et al., U.S. Appl. No. 11/298,248, entitled "Allocating Resources in a Multi-Tiered System," filed Dec. 9, 2005, pp. 1-25, Figs. 1-5.
Zhou et al., U.S. Appl. No. 11/117,197, entitled "Allocating Resources in a System Having Multiple Tiers," filed Apr. 28, 2005, pp. 1-32, Figs. 1-2.
K. Chaudhuri et al., "Server Allocation Algorithms for Tiered Systems," Sep. 7, 2005, pp. 1-16 <http://www.springerlink.com/content/3a1x8Incaag9ugyp/>.
U.S. Appl. No. 11/117,197, Final Rejection dated Aug. 28, 2009, pp. 1-22 and attachments.
U.S. Appl. No. 11/117,197, Non-Final Rejection dated Apr. 23, 2010, pp. 1-24 and attachments.
U.S. Appl. No. 11/117,197, Notice of Allowance dated Oct. 1, 2010, pp. 1-4.
U.S. Appl. No. 12/298,248, Final Rejection dated Jun. 29, 2009, pp. 1-23 and attachment.
U.S. Appl. No. 12/298,248, Non-Final Rejection dated Dec. 29, 2009, pp. 1-20 and attachment.
U.S. Appl. No. 12/298,248, Final Rejection dated Jun. 10, 2010, pp. 1-23 and attachment.
U.S. Appl. No. 11/298,248, Decision on Appeal dated Nov. 4, 2014 (7 pages).

* cited by examiner

ALLOCATION OF RESOURCES FOR TIERS OF A MULTI-TIERED SYSTEM BASED ON SELECTING ITEMS FROM RESPECTIVE SETS

CROSS-REFERENCE TO RELATED APPLICATION

This is related to U.S. patent application Ser. No. 11/117,197, entitled "Allocating Resources in a System Having Multiple Tiers," filed concurrently herewith.

BACKGROUND

Web-based resources, such as online information, online retail sites, and other web resources, are widely available to users over networks such as the Internet and intranets. Access to a web resource is provided by a website, which is typically implemented with a server system having one or more servers. Traffic at a popular website can be relatively heavy. If an insufficient number of servers are allocated to a website, then response times experienced by users when visiting the website can be long.

Typically, a server system that provides a website has a multi-tiered architecture that includes multiple tiers of servers. A user request submitted to the server system is typically processed by all the tiers. Thus, the total response time for a user request is the sum of the response times at respective tiers. The expected response time at each tier depends upon the number of servers allocated to the tier.

A web-based, multi-tiered architecture typically includes three tiers of servers: web servers, application servers, and database servers. Web servers communicate with the user (at a client system) and serve as the interface between the application servers and the user. Application servers parse user requests and perform predefined computations. Application servers in turn communicate with database servers to access requested information.

Conventional techniques have been proposed to allocate an adequate number of servers to each tier of a multi-tiered architecture to meet a desired response time constraint. However, conventional techniques for allocating the number of servers in each tier of a multi-tiered architecture employ algorithms that have processing times related exponentially to the input problem size. In other words, as the number of tiers of the multi-tiered server system increases, the processing time for computing the allocation of servers in each tier increases exponentially. Consequently, the amount of processing time involved in performing server allocation using conventional techniques for a multi-tiered server system can be relatively large. Also, conventional techniques are inflexible in that, in a particular system, users typically are limited to using one server allocation algorithm to address the server allocation issue.

DETAILED DESCRIPTION

Figure 1:
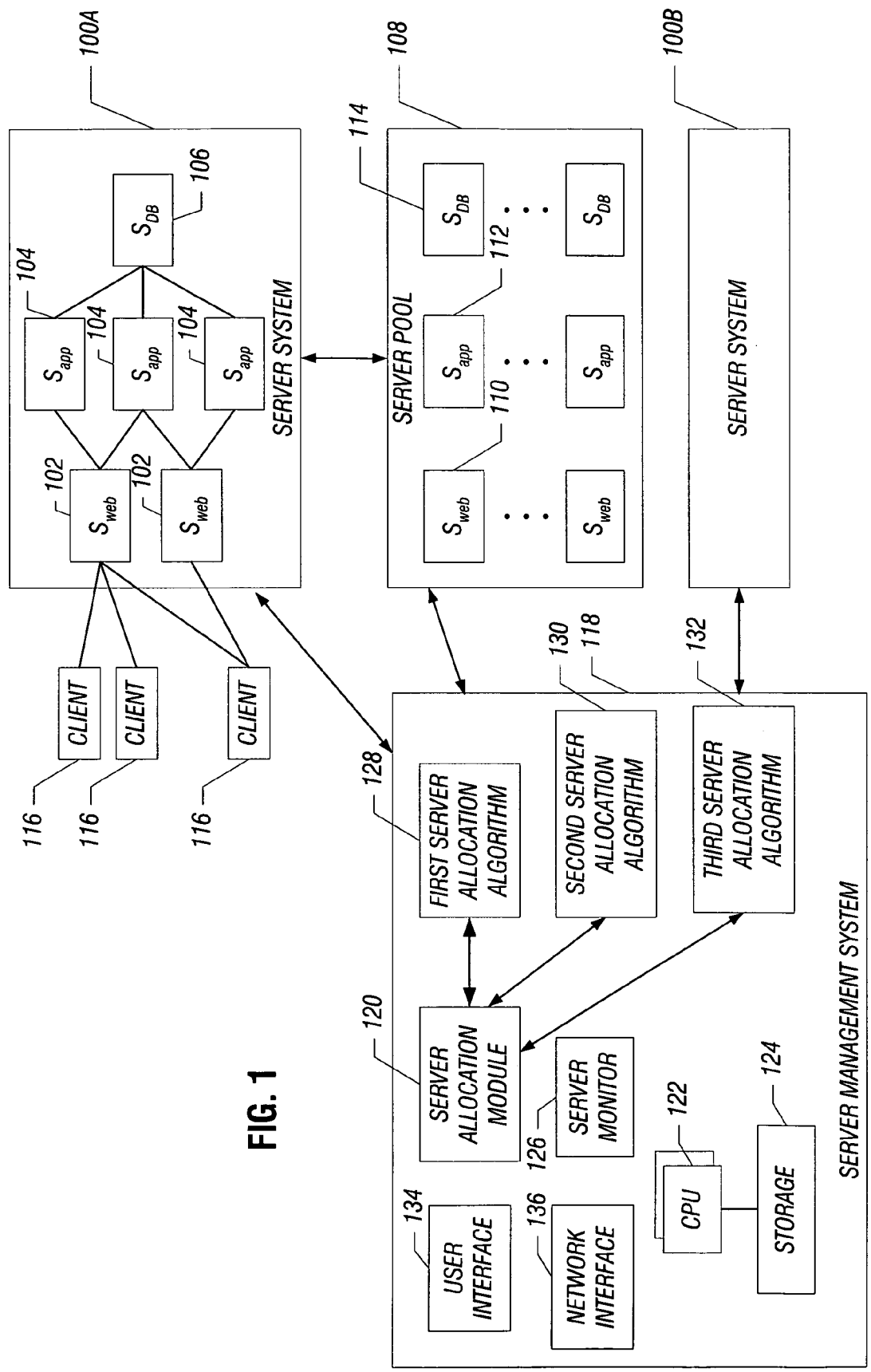
FIG. 1 is a block diagram of server systems and a server management system according to an embodiment of the invention.

FIG. 1 illustrates components of an example multi-tiered server system 100A, which includes multiple tiers of servers. The server system 100A includes a first tier of web servers 102, a second tier of application servers 104, and a third tier of database server(s) 106. In one example, the server system 100A is used for web-based applications (e.g., e-commerce, search engine, web service, and so forth). However, in other embodiments, the multi-tiered server system can include other types of servers for other applications, such as storage applications, utility computing shared environment applications, and so forth. Also, even though three tiers are depicted for the server system 100A in FIG. 1, it is contemplated that other multi-tiered server systems can include other numbers of tiers, such as two or greater than three.

FIG. 1 also shows another multi-tiered server system 100B, which can be configured in similar manner as server system 100A, or can be configured differently with different types of servers and different numbers of tiers. The example arrangement of FIG. 1 also shows a server pool 108, which includes a number of spare servers that are dynamically allocated to either server system 100A or server system 100B to expand the capacity of the server system 100A or 100B based on demands experienced by either server system 100A or 100B. In the embodiment of FIG. 1, the server pool 108 includes spare web servers 110, spare application servers 112, and spare database servers 114. One or more of each of the spare web servers 110, spare application servers 112, and spare database servers 114 are dynamically added to corresponding tiers of either the server system 100A or server system 100B to dynamically expand capacity at each respective tier.

For example, as user traffic at a server system increases, servers from the server pool 108 are added to one or more tiers of the server system to assure that average user response time is below some predefined threshold. In some cases, the predefined threshold is specified by a service level agreement (SLA) entered between the provider of the server system and another party, such as the party providing the e-commerce service, search engine service, or web service, as examples.

A "server" refers to a computer, a collection of computers, or any part of a computer (whether software or hardware or a combination of both).

As depicted in FIG. 1, client systems 116 are able to access the web servers 102 to issue requests (e.g., user requests) to the server system 100A. The same client systems 116, or other client systems, can issue requests to the server system 100B.

A server management system 118 (implemented as a computer in some embodiments) is coupled to the server systems 100A, 100B, and server pool 108. The server management system 118 includes a server allocation module 120, which in one example implementation is a software module (or plural software modules) executable on one or plural central processing units (CPUs) 122 in the server management system. The CPU(s) 122 is (are) coupled to storage 124.

The server management system 118 also includes a server monitor 126 that is executable on the CPU(s) 122. The server monitor 126 is used to monitor the status of each server system 100A, 100B. The server monitor 126 receives data (e.g., amount of user traffic, etc.) from each server system 100A, 100B and stores the data in the storage 124 for use by the server allocation module 120. Note that the tasks performed by the server monitor 126 and by the server allocation module 120 can be combined such that a single software module performs the tasks. Alternatively, the tasks can be performed by a larger number of software modules.

Also, although described in the context of software modules, it is contemplated that the server allocation and server monitoring tasks can be performed by hardware, or by a combination of hardware or firmware, in other embodiments.

The server allocation module 120 is able to dynamically allocate a number of servers to each tier of a multi-tiered server system (100A or 100B) depending upon the incoming workload (requests from client systems). The server allocation module 120 computes a number of servers allocated to each tier such that the total server system cost is reduced while a desired average response time is achieved for requests from the client systems 116. Average response time is one example of a response time constraint. Another example of a response time constraint includes maximum response time. Based on information collected by the server monitor 126, additional resources (in the form of servers) are dynamically allocated by the server allocation module 120 from the server pool 108 to the server system 100A or 100B to add resources to each tier to achieve the desired average response time. In another embodiment, the server allocation module 120 is able to allocate numbers of servers to respective tiers of a multi-tiered server system without using data from the server monitor 126.

Although reference is made to allocating servers to tiers of a server system, it is contemplated that other types of resources (e.g., CPUs, memory, etc.) can be allocated to plural tiers of any multi-tiered computer, according to alternative embodiments.

In accordance with some embodiments of the invention, for enhanced flexibility, the server allocation module 120 selects one of multiple server allocation algorithms to use for determining a system configuration (that includes a number of servers in each tier of the multi-tiered server system) such that total system cost is minimized while a response time constraint is satisfied.

In one embodiment, the server allocation module 120 is able to selectively use one of three algorithms, including a first server allocation algorithm 128, a second server allocation algorithm 130, and a third server allocation algorithm 132. In other embodiments, a smaller number or larger number of server allocation algorithms can be selectively used.

The first server allocation algorithm 128 (referred to as the "two-approximation algorithm") is relatively fast since the first server allocation algorithm 128 computes an approximate solution with a total system cost that is at most twice the optimal cost. The term "optimal cost" refers to the minimum cost that can be achieved by an optimum configuration of the multi-tiered server system while still satisfying the response time constraint.

The second server allocation algorithm 130 (referred to as the "pseudo-polynomial-time exact algorithm") computes an optimal (or exact) solution, rather than an approximate solution, in pseudo-polynomial running time (as contrasted with the exponential running time associated with some conventional techniques for server allocation). The term "pseudo-polynomial running time" refers to the polynomial running time of an algorithm if all input numbers have bounded sizes, where the algorithm typically runs in exponential or other longer running time otherwise.

The third server allocation algorithm 132 (referred to as the "fully-polynomial-time approximation algorithm") computes an approximate solution with the total cost at most (1+ϵ) times the optimal cost, where the running time is a polynomial in both 1/ϵ and k, where k is the number of tiers.

Note that the first and third algorithms produce feasible solutions regarding the numbers of servers for respective tiers that satisfy the response time constraint, but the solutions are not optimal (but rather are approximate) in the sense that the solutions do not achieve optimal (e.g., minimum) cost. However, the second algorithm produces a solution that achieves optimal (e.g., minimum) cost.

A property of a multi-tiered server system architecture is that the delay experienced by a request in each tier depends upon the number of servers in that tier and is not affected by the number of servers in any other tier. Thus, according to some embodiments, the response time for a request can be computed by summing the delays in individual tiers to obtain the total response time.

In one embodiment, the server allocation module 120 of the server management system 118 uses a response time model that assumes that all servers in the same tier are identical, and that the workload is shared approximately equally among all the servers in the same tier. The server allocation module 120 performs server resource allocation modeled as an integer optimization problem, with one linear objective function and an arbitrary decomposable additive constraint, as follows:

$$\min \sum_{i=1}^{k} h_i N_i \qquad \text{(Eq. 1)}$$

$$\text{s.t.} \sum_{i=1}^{k} f_i(N_i) \leq T$$

$N_1, \ldots, N_k$ are positive integers.

In the equation, $h_i$ represents a cost of a server, and $f_i(N_i)$ represents a function for calculating a response time based on a number $N_i$ of servers at tier i. Conventionally, allocating servers to different tiers of a multi-tiered computing system with the objective of minimizing system cost while meeting a response time constraint across all the tiers typically is NP-hard in general (where computation time is exponential). However, according to some embodiments of the invention, polynomial-time approximation algorithms (first and third server allocation algorithms 128 and 132) and a pseudo-polynomial-time exact algorithm (130) are selectively used to allocate server resources. The approximation algorithms run in polynomial time and offer the flexibility to control the tradeoff between solution quality and running time. In other words, approximate server allocation solutions can be computed to quickly obtain results in certain situations. If more accurate results are desired, then the exact algorithm 130 is used. The ability to select one of plural server allocation algorithms provides enhanced flexibility for changing system environments.

Use of the approximation algorithms (e.g., first and third server allocation algorithms 128 and 132) provide smaller computation times than exponential-time based server allocation algorithms. Also, as described further below, the pseudo-polynomial-time algorithm 130 is transformed into a multi-choice knapsack problem that simplifies the computation of numbers of servers in a multi-tiered server system.

Using server allocation techniques according to some embodiments, user control of running time and solution quality is provided. Selection (either by user or the server management system 118) of the approximation algorithms (first or third algorithms) results in reduced computation time and reduced solution quality, but selection of the optimal algorithm (second algorithm) results in increased computation time, but increased solution quality. As discussed further below, control of usage of storage space can also be accomplished by selecting a server allocation algorithm with reduced storage usage.

In the response time model according to an example implementation, if the request arrival rate is $\lambda_i$ (incoming workload)

for the i-th tier, and this tier has $N_i$ servers, then each server has a request arrival rate of $\lambda_i/N_i$. In one implementation, each server is modeled as a processor-sharing queue. The expected response time is given by the expected time in a system with an M/G/1 queuing model (Poisson distribution for request interarrival density, arbitrary distribution for service processing time, and one single queue with unbounded buffer length):

$$R_i(N_i) = \frac{E[S_i]}{1 - \left(\frac{\lambda_i}{N_i}\right)E[S_i]}, \quad (Eq. 2)$$

where $R_i(N_1)$ represents the average response time of the i-th tier, $S_i$ is a random variable denoting the processing time (or service demand) of a request on a resource (such as a CPU) at the i-th tier, and $E[S_i]$ is the expected processing time of a request on a resource. In other implementations, other queuing models can be employed.

The parameter $E[S_i]$ can be estimated from the measured utilization rate, $u_i$, of the resource as follows: $E[S_i]=u_i/(\lambda_i/N_i)$. The average response time, R(N), for a k-tier server system is the sum of the delays in all the tiers. Therefore, $$R(N) = \sum_{i=1}^{k} R_i(N_i) = \sum_{i=1}^{k} \frac{E[S_i]}{1 - \frac{\lambda_i E[S_i]}{N_i}}, \quad (Eq. 3)$$

where $N=(N_1, N_2, \ldots, N_k)$. The parameter N is referred to as a configuration, and represents the numbers of servers in respective tiers.

From Eq. 3, it follows that there exist multiple server configurations satisfying a given response time constraint. Among these multiple feasible allocations, it is desired to find the one configuration that has the minimum cost. Finding the configuration with the minimum cost can be formulated as the following optimization problem:

$$\min_{N_i} \sum_{i=1}^{k} h_i N_i \quad (Eq. 4)$$

$$\text{s.t. } R(N) = \sum_{i=1}^{k} \frac{E[S_i]}{1 - \frac{\lambda_i E[S_i]}{N_1}} \leq T_0; \quad (Eq. 5)$$

$N_i$ integer with $N_i > \lambda_i E[S_i]$, for $i = 1, \ldots, k,$ where $T_0$ is the response time threshold value and the weights $h_i$ (all assumed to be positive) are the costs of each server in the different tiers. In other words, $h_i$ represents the cost of a server in the i-th tier. In the case where costs are difficult to ascertain, a convenient simplification involves minimizing the total number of servers $\Sigma_{i=1}^{k} N_i$; that is, to set $h_i=1$ for all i. Because:

$$\frac{E[S_i]}{1 - \frac{\lambda_i E[S_i]}{N_i}} = \frac{N_i E[S_i]}{N_i - \lambda_i E[S_i]} = E[S_i] + \frac{\lambda_i E[S_i]^2}{N_i - \lambda_i E[S_i]}, \text{ for all } i,$$

the non-linear constraint (Eq. 5) can be further simplified as follows:

$$\sum_{i=1}^{k} \frac{\lambda_i E[S_i]^2}{N_i - \lambda_i E[S_i]} \leq T_0 - \sum_{i=1}^{k} E[S_i].$$

Let $a_i=\lambda_i E[S_i]^2$, $b_i=\lambda_i E[S_i]$ and $T=T_0-\Sigma_{i=1}^{k} E[S_i]$, then the response time constraint (in this example the average response time constraint) becomes:

$$\sum_{i=1}^{k} \frac{a_i}{N_i - b_i} \leq T. \quad (Eq. 6)$$

Note that the response time constraint takes into account the incoming workload, $\lambda_i$, from each tier i. Even though server allocation is generally NP-hard for a variable number of tiers, real-world systems are usually composed of a relatively small number of tiers. For example, a typical e-commerce application has three tiers. Where the number of tiers is constant, it is possible to solve the server allocation problem in polynomial time or pseudo-polynomial time, using algorithms according to some embodiments.

Figure 2:
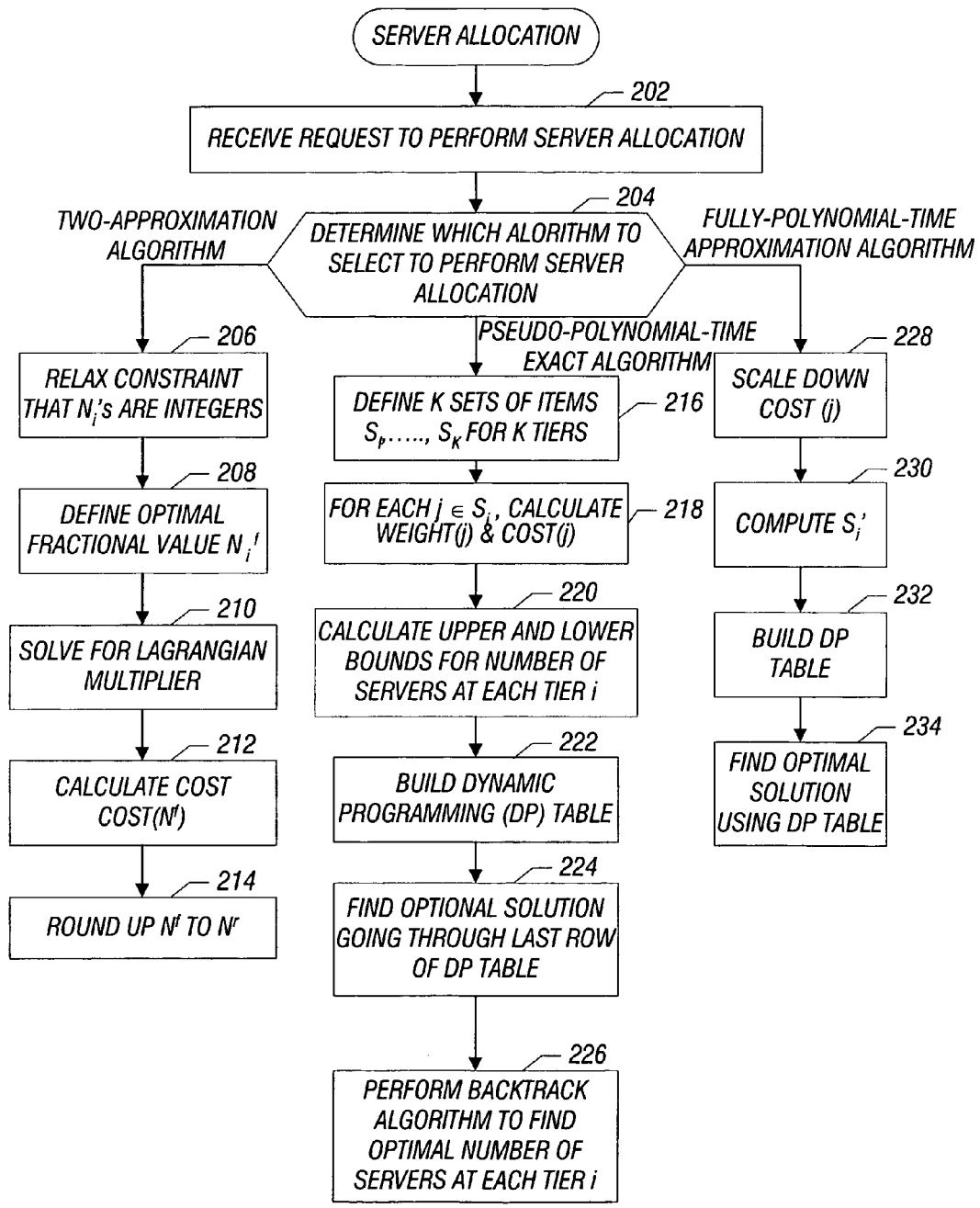
FIG. 2 is a flow diagram of a process performed by a server allocation module executable in the server management system, in accordance with an embodiment.

FIG. 2 shows a server allocation process performed by the server allocation module 120 (FIG. 1), according to an embodiment. In response to receiving (at 202) a request (such as through the user interface 134, through the network interface 136, or from elsewhere) to perform server allocation, the server allocation module 120 determines (at 204) which algorithm to select to perform the server allocation. The received request includes a request from a user, or a request automatically initiated in the server management system 118 or from another source.

Selection of the algorithm (at 204) is based on various factors, including user input, as well as factors relating to how accurate the results should be. For example, a user may expressly indicate which of the three algorithms to use for performing the server allocation process. Alternatively, the server allocation module 120 can determine, from the context of the request, whether the desired server allocation determination is to be highly accurate or just a rough approximation. In one example context, a user may be accessing the server management system 118 (FIG. 1) "on-line" (such as the user interactively using the server management system 118 to obtain answers regarding server allocation in the server system 100A or 100B (FIG. 1) to meet incoming workloads). In such a context, use of either the first or third approximation algorithms would likely provide a quicker answer (approximate answer) than the second algorithm. Note that the first algorithm (the two-approximation algorithm) usually also has a faster running time than the third approximation algorithm (depending on the value set for $\epsilon$ in the third approximation algorithm).

Thus, in the context where a relatively quick answer is desirable, the server management system 118 (FIG. 1) selects one of the approximation algorithms. In a different context, where computation time is not an issue and a more accurate solution is desirable, the server management system selects the second server allocation algorithm. More generally, the server management system determines, based on one or more conditions, which of the server allocation algorithms to select. The one or more conditions include a specific indication in the request issued by the user (user selection), or other conditions relating to the context in which a request for server allocation was submitted (e.g., user is on-line and would like an answer quickly) which provides some indication of the desired computation time and solution quality.

In response to determining that the first algorithm 128 (FIG. 1), which is the two-approximation algorithm, is to be used, the server allocation module 120 relaxes (at 206) the constraint that each $N_i$ (the number of servers at the i-th tier) should be an integer. According to the two-approximation algorithm, the Lagrangian multiplier method is used to compute a closed-form solution for the relaxed optimization problem (where the value of each $N_i$ does not have to be integer). According to this algorithm, the output value obtained for each $N_i$ is a fractional value. To be meaningful, the fractional value is rounded up to the nearest integer. Therefore, according to this method, the approximate solution provides a solution with a cost that is less than twice the minimum cost, and at most one extra server per tier.

The Lagrangian multiplier method uses a Lagrangian function where $\lambda$ is the Lagrangian multiplier:

$$L(N_1, N_2, \ldots, N_k, \lambda) = \sum_{i=1}^{k} h_i N_i + \lambda \left( \sum_{i=1}^{k} \frac{a_i}{N_i - b_i} - T \right) \quad \text{(Eq. 7)}$$

Note that $N_1$ represents the number of servers at tier 1, $N_2$ represents the number of servers at tier 2, and $N_k$ represents the number of servers at tier k. As discussed above, the expression $$\sum_{i=1}^{k} h_i N_i$$

represents the total cost of having $N_i$ servers at tier i for i=1, . . . k (in a k-tier system). The expression $$\left( \sum_{i=1}^{k} \frac{a_i}{N_i - b_i} - T \right)$$

represents the response time constraint. The following equation represents the partial derivative of the expression of Eq. 7 with respect to $N_i$, which is set to zero:

$$\frac{\partial L}{\partial N_i} = h_i - \lambda \cdot \frac{a_i}{(N_i - b_i)^2} = 0, \quad \text{(Eq. 8)}$$

$$i = 1, \ldots, k.$$

Solving for $N_i$ in Eq. 8, an optimal fractional value $N_i^f$ is obtained (at 208) as follows:

$$N_i^f = b_i + \sqrt{\frac{\lambda a_i}{h_i}}, i = 1, \ldots, k. \quad \text{(Eq. 9)}$$

The fractional value $N_i^f$ represents the optimal number (a fractional value) of servers at tier i. Since the $N_i^f$ values are continuous, the non-linear constraint is binding:

$$\sum_{i=1}^{k} \frac{a_i}{N_i^f - b_i} = T. \quad \text{(Eq. 10)}$$

Substituting the expression set equal to $N_i^f$ in Eq. 9 into the equality of Eq. 10 and simplifying algebraically, the server allocation module 120 solves (at 210) for the Lagrangian function multiplier $\lambda$ as follows:

$$\sqrt{\lambda} = \frac{\sum_{i=1}^{k} \sqrt{h_i a_i}}{T}. \quad \text{(Eq. 11)}$$

Then the cost of the relaxed Lagrangian solution is calculated (at 212) as follows:

$$\text{cost}(N^f) = \sum_{i=1}^{k} h_i N_i^f = \sum_{i=1}^{k} h_i b_i + \frac{\left( \sum_{i=1}^{k} \sqrt{h_i a_i} \right)^2}{T}. \quad \text{(Eq. 12)}$$

The optimal fractional solution $N_i^f$ is converted into a feasible two-approximation solution directly by rounding up (at 214) the optimal fractional solution $N_i^f$ to an approximate integer solution $N_i^r$. Specifically, $$N_i^r = \lceil N_i^f \rceil,$$

for all i. Because $N_i^r \geq N_i^f$ for all i, $\sum_{i=1}^{k} a_i/(N_i^r - b_i) \leq \sum_{i=1}^{k} a_i/(N_i^f - b_i) = T$. Therefore, the rounded up integer values $N_i^r$ for i=1, . . . , k, satisfy the response time constraint and $N_i^r$ is a feasible, approximate solution to the server allocation problem. Furthermore, $N_i^r$ gives a two-approximation to the server allocation problem, in other words, cost $(N^r) \leq 2 \cdot \text{cost}(N^*)$, where $N^*$ is an optimal solution. The value cost $(N^r)$ is the cost associated with $N_i^r$ servers in the k tiers (i=1, . . . , k).

An output of the two-approximation server allocation algorithm (128 in FIG. 1) includes the values $N_i^r$, i=1, . . . , k, which are approximate numbers of servers at respective tiers i. The cost, cost($N^r$), associated with implementing these numbers of servers at the tiers i is at most twice the optimal cost, or $2 \cdot \text{cost}(N^*)$. The computation time for computing the two-approximation server allocation algorithm is linear time (related linearly to the number of tiers).

If the server allocation module 120 determines (at 204) that the algorithm to select is the pseudo-polynomial-time exact algorithm (second server allocation algorithm 130 in FIG. 1), then the server allocation module defines (at 216) k sets of items $S_1, \ldots, S_k$ for k tiers. The sets $S_1, \ldots, S_k$ are sets used for a multi-choice knapsack problem. The server allocation problem according to the second server allocation algorithm 130 becomes an algorithm that solves for the multi-choice knapsack problem optimally. The second server allocation algorithm 130 is a pseudo-polynomial-time algorithm that runs in polynomial time if all input numbers are bounded above by a constant. Such algorithms are technically exponential but display polynomial-time behavior in many practical applications. The NP-hard multi-choice knapsack problem is pseudo-polynomial-time solvable using the second algorithm 130 according to some embodiments.

The multi-choice knapsack problem is a generalization of the ordinary knapsack problem, in which there are m sets of items $S_1, \ldots, S_m$ with $|S_i|=n_i$ for all i and $\Sigma_{i=1}^{m} n_i = n$. Each item $j \in S_i$ includes a weight $w_{ij}$ and a profit $p_{ij}$, and the knapsack has capacity W. The objective is to pick exactly one item from each set, such that the profit sum is maximized and the weight sum is bounded by W.

When applied to the server allocation problem with k tiers, the multi-choice knapsack problem includes k sets of items $S_1, \ldots, S_k$. For an item $j \in S_i$, parameters weight(j) and cost(j) are calculated (at 218) as follows:

$$\text{weight}(j) = \frac{a_i}{j - b_i}, \quad \text{cost}(j) = j \cdot h_i. \tag{Eq. 13}$$

The parameter weight(j) represents the response time for j servers in tier i, and the parameter cost(j) represents the cost of j servers at tier i. For the server allocation optimization problem, there is no cost constraint; thus any $j > b_i$ is a feasible item in $S_i$. Thus, each set $S_i$ has plural items j, representing numbers of servers, with each item j associated with parameters weight(j) (response time for j servers) and cost(j) (cost of j servers).

To reduce the size of input sets $S_i$, and thus achieve polynomial-time computation time, the number of servers allocated at each tier is bounded within a lower bound $n_i^l$ and an upper bound $n_i^u$, calculated at (220). Based on the response time constraint, the lower bound $n_i^l$ is defined as follows:

$$\frac{a_i}{N_i - b_i} \le \sum_{i=1}^{k} \frac{a_i}{N_i - b_i} \le T \Rightarrow N_i \ge b_i + \frac{a_i}{T} \equiv n_i^l. \tag{Eq. 14}$$

Thus, $n_i^l$ is a lower bound on the number of servers to be allocated at the i-th tier, where the lower bound $n_i^l$ is calculated based on the response time constraint (see Eq. 6 above). Next, to calculate the upper bound, the two-approximation solution $N_i^r$ is considered (according to the first server allocation algorithm). Let $C^r = \text{cost}(N^r)$. Since $C^r$ is an upper bound on the total cost of the optimal solution, $n_i^u$ is defined as follows:

$$h_i N_i + \sum_{j | j \ne i} h_j n_j^l \le \sum_{j=1}^{k} h_j N_j \le C^r \Rightarrow N_i \le \frac{C^r - \sum_{j | j \ne i} h_j n_j^l}{h_i} \equiv n_i^u. \tag{Eq. 15}$$

Thus, $n_i^u$ is an upper bound on the number of servers to be allocated at the i-th tier, where $n_i^u$ is calculated based on the cost associated with the two-approximation algorithm.

Given $n_i^l$ and $n_i^u$, the server allocation module 120 (FIG. 1) has to just consider items $j \in S_i$ satisfying $$\lceil n_i^l \rceil \le j \le \lfloor n_i^u \rfloor.$$

Without loss of generality, it is assumed that $n_i^l$ and $n_i^u$ are both integers. Otherwise $n_i^l$ can be replaced by $$\lceil n_i^l \rceil$$

and $n_i^u$ can be replaced by $$\lfloor n_i^u \rfloor.$$

Then set $S_i$ has $n_i^u - n_i^l + 1$ items, which reduces the number of items involved in the calculation to solve for $N = (N_1, N_2, \ldots, N_k)$, the optimal configuration.

Solving the multi-choice knapsack problem causes selection of items from respective sets $S_1, \ldots, S_k$ that satisfy the response time constraint and a target cost (e.g., an optimal cost). In one example, the optimal cost is the minimum cost. The multi-choice knapsack problem can be solved in pseudo-polynomial time by building (at 222) a dynamic programming (DP) table. There are two ways to build the dynamic programming table, using either the cost or the weight. As the weights of items are not integers, and the costs are integers, the DP table is efficiently built using the cost dimension. The DP table is a two-dimensional table having k rows (corresponding to the k tiers) and $C^r$ columns (where $C^r$ is the cost associated with the two-approximation algorithm described above). Each cell of the DP table (which contains $k \times C^r$ cells) has a value F(i,c), which represents the minimum weight (or response time) of items selected from the first i item sets with total cost bounded by c, for $i = 1, \ldots, k$, and $c = 1, \ldots, C^r$. The i-th row of the DP table represents the optimal solution, minimum response time F(i,c), for the first i tiers. The first row of the DP table, F(1, c) is relatively easy to compute:

$$F(1, c) = \min\{\text{weight}(j) \mid j \cdot h_1 \le c\}, c = 1,$$

$\ldots, C^r$. Each field (representing the response time) of the first row F(1, c) is the minimum response time weight(j), such that $j \cdot h_1 \le c$.

Once the first row is computed, the subsequent rows (2, 3, $\ldots$, k) of the DP table F(,) are built using the following recursion function:

$$F(i, c) = \min_{j \in S_i} \{F(i - 1, c - \text{cost}(j)) + \text{weight}(j)\}. \tag{Eq. 16}$$

According to Eq. 16, F(i,c) is an aggregate value derived by summing the F(,) value from a previous row F(i−1, c−cost(j)) and the weight value, weight(j) (response time), of the current row, based on a selected j (number of servers) from set $S_i$. Set $S_i$ has multiple j values (representing different numbers of servers), in the range $n_i^l \le j \le n_i^u$.

F(i,c) represents the minimum response time given a fixed cost c (derived based on cost(j)) for the first i tiers. From the two-approximation algorithm, $C^r$ (the cost of $N^r$) is within a factor of two of cost($N^*$), the optimum cost. The size of the cost dimension (number of columns) in the DP table is $C^r$. As a result, the total time involved in building the table is $O(C^r \cdot \Sigma_{i=1}^{k}(n_i^u - n_i^l)) = O(\text{cost}(N^r) \cdot \Sigma_{i=1}^{k}(n_i^u - n_i^l))$.

Once the DP table has been built, an optimal solution is found (at 224) by going through the last row, F(k,c), of the DP table and choosing the minimum cost c, such that F(k,c) is bounded by T (which is the response time constraint).

In other words, in step 224, the server allocation module 120 walks through the last row F(k) and chooses the minimum c value ($c_0$) such that F(k, $c_0$)≤T. The value $c_0$ is the minimum cost of the server allocation problem (aggregated for all k tiers) with the total response time, F(k, $c_0$), bounded by T.

Let A be an output array to hold the optimal solution, where each entry of the output array A is equal to the optimal number of servers for a respective tier. In other words, A[i], i=1, ..., k, represents the optimal number of servers in the i-th tier. To calculate the values for A, the server allocation module 120 performs (at 226) a backtrack algorithm to find the optimal number of servers at each tier i.

The backtrack algorithm starts with i=k, c=$c_0$, and continues through a loop until i=0 (i=k, ..., 0). The backtrack algorithm walks through the i-th row and finds a value j∈$S_i$, such that F(i,c)=F(i-1, c-cost(j))+weight(j). Effectively, in the i-th row, the algorithm identifies the entry with the minimum response time. That entry of the i-th row corresponds with a j value (that represents the number of servers at the i-th tier). Then the value A[i] is set as A[i]=j, and the values of i and c are updated as i←i-1, c←c-cost(j). Effectively, for row k of the DP table, A[k]=j, where j is the value where F(k,$c_0$)= F(k-1, $c_0$-cost(j))+weight(j).

In terms of performance, the above algorithm runs in time $O(C^r \cdot \Sigma_{i=1}^{k}(n_i^u - n_i^l)) = O(\text{cost}(N^r) \cdot \Sigma_{i=1}^{k}(n_i^u - n_i^l))$. The second server allocation algorithm thus runs in pseudo-polynomial time, which is less than an exponential time.

As explained above, the two-approximation algorithm (the first server allocation algorithm 128 in FIG. 1) provides an approximated solution with a cost that is less than twice the minimum cost. On the other hand, the pseudo-polynomial-time exact algorithm (the second server allocation algorithm 130 in FIG. 1) provides an exact solution that runs in pseudo-polynomial time. In accordance with some embodiments of the invention, an intermediate solution also can be achieved by using the third server allocation algorithm 132 (FIG. 1), which is a fully-polynomial-time approximation scheme. The approximate solution provided by the third server allocation algorithm 132 has better accuracy than the two-approximation algorithm.

The pseudo-polynomial-time algorithm described above can be converted into a fully-polynomial-time approximation scheme using cost scaling. The approximation scheme is almost identical to the pseudo-polynomial time algorithm, with the difference that a scaled down cost for each item is used and calculated (at 228) as follows:

$$\text{scost}(j) = \left\lceil \frac{k \cdot \text{cost}(j)}{\varepsilon \cdot C^r} \right\rceil, \forall j \in S_i. \quad (\text{Eq. 17})$$

The scaled down cost scost(j) replaces the cost(j) value associated with the second server allocation algorithm that is associated with items j in each set of the multi-choice knapsack problem. The value ε is selected based on the level of accuracy desired—a low ε value provides greater accuracy but involves greater processing time. Let $S'_i$ denote the i-th set with items associated with scaled costs. In other words, each set $S'_i$ includes items j that are each associated with scaled costs rather than the actual costs. If two items in the set have the same scaled cost, then the one with less weight (response time) is kept while the other item is discarded. The scost values are integer values calculated by rounding down the computed value according to Eq. 17. By using the scaled down cost values, the number of items in each set $S'_i$ of the multi-choice knapsack problem is further reduced for greater computational efficiency. However, the solution provided is an approximate solution, whose accuracy is based on the value of ε.

The set $S'_i$ is computed (at 230), where $S'_i$ contains k·1/ε different scost values. Each set $S'_i$ thus contains at most k/ε different items. $S'_i$ is computed efficiently according to the following algorithm. For each fixed t from 1 to k/ε, consider all the items j∈$S_i$ such that scost(j)=t. The maximum value of j, denoted $j_t$, can be calculated in O(1) time (or constant time). The weight (response time) of the maximum $j_t$ value becomes weight($j_t$)=$a_i$/($j_t$-$b_i$). The item with scost=t and weight=weight($j_t$) is placed into set $S'_i$. The procedure to compute $S'_i$ takes both time and space O(k·1/ε).

To save storage space, not all the $S'_i$ have to be computed in advance. Based on the generated sets $S'_i$, a DP table is built (at 232), using a technique similar to that used for the pseudo-polynomial-time exact algorithm, described above. For improved efficiency, when computing the DP table, the whole DP table does not have to be stored. Instead, the entries F(i,c) of the DP table can be computed row by row. For i=1, ..., k, F(i,c) is computed for all possible values of c. At the time of computing the i-th row F(i), first $S'_i$ is computed, then the row F(i) is computed using the values of the previous row F(i-1) and $S'_i$. After the i-th row F(i) is finished, $S'_i$ and F(i-1) are discarded, and the server allocation module 120 continues by processing the (i+1)-th row. As a result, the total storage usage for this algorithm is O(k·1/ε). Note that a similar storage savings technique can be applied to the second server allocation algorithm described above.

With costs scaled, the cost of the optimal solution is bounded by k·1/ε. There are k rows of the DP table, with each row of the DP table having length k/ε (that is, B=k/ε, where B represents the number of columns in the DP table), and each cell takes time O(k/ε) to compute. Thus, the total processing time becomes O($k_3$·1/$ε^2$). In summary, this third server allocation algorithm involves a processing time O($k^3$·1/$ε^2$) and storage space O(k·1/ε).

Each item of a set $S'_i$ with scaled cost induces an error bounded by (ε·$C^r$/k). There are a total of k items in the solution; thus, the total error in the cost is bounded by ε·$C^r$. Since $C^r$ is a two-approximation of the optimal cost, it follows that the total error is bounded by ε·$C^r$≤2ε·cost($N^*$). By replacing ε by ε/2, the time and space complexities of the above algorithm will change only by a constant factor, thus asymptotically the same bounds hold. This gives a (1+ε)-approximation to the server allocation problem. Using the third server allocation algorithm, the number of servers $N_i'$ computed for each tier i is a feasible allocation of the number of servers for that tier—however, this feasible allocation of the number of servers does not achieve an optimal cost, but rather, a (1+ε)-approximation of the optimal cost. In other words, the cost of the approximate solution $N_i'$ for i=1, ..., k satisfies cost(N')≤(1+ε)·cost($N^*$).

Instructions of such software routines described above are loaded for execution on processors (such as CPU(s) 122 in FIG. 1). The processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
    defining, for a multi-choice knapsack problem, plural sets of items corresponding to plural tiers of a multi-tiered system, the items of each of the plural sets representing different amounts of resources to allocate to a corresponding one of the tiers, the defining comprising associating weights and costs with respective items, wherein a weight represents a response time for the amount of resources represented by the corresponding item, and a cost represents a cost of the amount of resources represented by the corresponding item, and wherein increasing the amount of resources allocated to each of the tiers causes a capacity of the corresponding tier to increase, wherein the amounts of resources are selected from the group consisting of: (1) numbers of servers, and (2) numbers of central processing units (CPUs);
    selecting, by one or more processors, items from the respective sets based on a response time constraint and a target cost, an item selected from a first of the plural sets specifying a respective amount of resources to allocate to a first of the plural tiers, and an item selected from a second of the plural sets specifying a respective amount of resources to allocate to a second of the plural tiers, the first set containing items for the first tier, and the second set containing items for the second tier;
    providing, by the one or more processors, information pertaining to allocation of amounts of resources for the respective tiers based on the selected items;
    scaling the costs in the sets, wherein scaling the costs comprises:
        dividing the costs by a factor, wherein the costs divided by the factor produce fractional numbers,
        rounding up the fractional numbers to provide the scaled costs; and
    removing items having duplicate scaled costs to reduce sizes of the sets.

2. The method of claim 1, wherein selecting the items from the respective sets is based on solving the multi-choice knapsack problem.

3. The method of claim 1, wherein providing the information pertaining to allocation of amounts of resources based on selecting items associated with scaled costs comprises providing information pertaining to an approximate solution including allocation of amounts of resources to the respective tiers, the approximate solution associated with a total cost that is greater than a total cost associated with an optimal solution.

4. The method of claim 1, further comprising:
    for at least one of the tiers, defining a lower bound value regarding an amount of resources and an upper bound value regarding an amount of resources,
    wherein defining the set of items for a particular one of the tiers comprises defining the set for the particular tier to exclude items associated with amounts of resources less than the lower bound value or greater than the upper bound value.

5. The method of claim 4, wherein defining the lower bound value is based on a response time constraint.

6. The method of claim 4, wherein defining the upper bound value is based on a solution of an approximate server allocation algorithm that provides a solution having a cost less than twice an optimal cost value.

7. The method of claim 4, wherein the multi-tiered system has k tiers, wherein defining the lower bound value comprises defining a lower bound value having value $$b_i + \frac{a_i}{T},$$

where i represents tier i, i having one of values from 1 to k, $a_i = \lambda_i E[S_i]^2$, $b_i = \lambda_i E[S_i]$, $T = T_0 - \Sigma_{i=1}^{k} E[S_i]$, $\lambda_i$ represents a request arrival rate at tier i, $E[S_i]$ represents an expected processing time of a request, and $T_0$ represents a response time threshold.

8. The method of claim 7, wherein defining the upper bound value comprises defining the upper bound value having value $C^r - \Sigma_{j|j \neq i} h_j n_j^l$, where $C^r$ represents a cost of an approximate solution produced by an approximate resource allocation algorithm, $h_1$ represents a cost of a resource at tier j, $h_i$ represents a cost of a resource at tier i, and $n_j^l$ represents the lower bound value.

9. The method of claim 1, wherein the defining, selecting, and providing are parts of a resource allocation algorithm, the method further comprising executing the server allocation algorithm in polynomial time.

10. The method of claim 9, wherein the resource allocation algorithm normally runs in exponential time, the method further comprising setting upper bounds for numbers of items in respective sets to enable the resource allocation algorithm to run in the polynomial time.

11. The method of claim 2, further comprising building a dynamic programming table having plural rows corresponding to the plural tiers, wherein solving the multi-choice knapsack problem uses the dynamic programming table, wherein the dynamic programming table has cells representing respective response times and has columns corresponding to respective costs associated with corresponding amounts of resources in respective tiers.

12. The method of claim 11, wherein the amounts of resources in respective tiers comprise numbers of servers in respective tiers, and wherein building the dynamic programming table comprises building a dynamic programming table having $C^r$ columns, where $C^r$ represents a total cost of an approximate server allocation algorithm.

13. A method comprising:
defining, for a multi-choice knapsack problem, plural sets of items corresponding to plural tiers of a multi-tiered system, the items representing corresponding numbers of servers to allocate to the tiers, the defining comprising associating weights and costs with respective items, wherein a weight represents a response time for the number of servers represented by the corresponding item, and a cost represents a cost of the number of servers represented by the corresponding item, each of the items of a first of the plural sets representing a corresponding different number of servers to allocate to a first of the tiers, and each of the items of a second of the plural sets representing a corresponding different number of servers to allocate to a second of the tiers;

selecting, based on solving the multi-choice knapsack problem by one or more processors, items from the respective sets based on a response time constraint and a target cost, wherein the selecting is based on an objective to pick one item from each of the plural sets according to an aggregate calculated on attribute values associated with corresponding ones of the items;

providing, by the one or more processors, information pertaining to allocation of numbers of servers for the respective tiers based on the selected items;

scaling the costs in the sets, wherein scaling the costs comprises:
  dividing the costs by a factor, wherein the costs divided by the factor produce fractional numbers,
  rounding up the fractional numbers to provide the scaled costs; and
removing items having duplicate scaled costs to reduce sizes of the sets.

14. A non-transitory machine-readable storage medium storing instructions that when executed effect resource allocation for a system having plural tiers, the resource allocation comprising:
providing, for a multi-choice knapsack problem, plural sets of items corresponding to the plural tiers of the system, wherein the items represent corresponding numbers of servers to allocate to the corresponding tiers, the defining comprising associating weights and costs with respective items, wherein a weight represents a response time for the number of servers represented by the corresponding item, and a cost represents a cost of the number of servers represented by the corresponding item;

selecting, based on solving the multi-choice knapsack problem, items from the respective sets based on a response time constraint and a target cost;

providing information pertaining to allocation of numbers of servers to respective ones of the plural tiers based on the selected items; and scaling the costs in the sets, wherein scaling the costs comprises:
  dividing the costs by a factor, wherein the costs divided by the factor produce fractional numbers,
  rounding up the fractional numbers to provide the scaled costs; and
removing items having duplicate scaled costs to reduce sizes of the sets.

15. The machine-readable storage medium of claim 14, wherein an item selected from a first of the plural sets specifies a number of servers to allocate to a first of the tiers, and wherein an item selected from a second of the plural sets specifies a number of servers to allocate to a second of the tiers.

16. A system comprising:
at least one processor; and
a resource allocation module executable on the at least one processor to:
  define, for a multi-choice knapsack problem, plural sets of items corresponding to plural tiers of a multi-tiered system, the items of each of the plural sets representing different amounts of resources to allocate to a corresponding one of the respective tiers, the defining comprising associating weights and costs with respective items, wherein a weight represents a response time for the amount of resources represented by the corresponding item, and a cost represents a cost of the amount of resources represented by the corresponding item, and wherein increasing the amount of resources allocated to each of the tiers causes a capacity of the corresponding tier to increase, and wherein a first of the plural sets contains items for a first of the plural tiers, and a second of the plural sets contains items for a second of the plural tiers;
  select, by solving the multi-choice knapsack problem, items from respective sets based on a response time constraint time and an optimal cost, wherein an item selected from the first set specifies a respective amount of resources to allocate to the first tier, and wherein an item selected from the second set specifies a respective amount of resources to allocate the a second tier;
  provide information pertaining to allocation of amounts of resources to the respective tiers based on the selected items;
  scaling the costs in the sets, wherein scaling the costs comprises:
    dividing the costs by a factor, wherein the costs divided by the factor produce fractional numbers,
    rounding up the fractional numbers to provide the scaled costs; and
  removing items having duplicate scaled costs to reduce sizes of the sets.

* * * * *